Nov. 8, 1966 A. A. STEWARD 3,283,411

TRACKING ERROR MEASURING DEVICE

Filed Aug. 27, 1964

INVENTOR.
ALAN A. STEWARD

BY Eckhoff and Slick

ATTORNEYS

United States Patent Office 3,283,411

Patented Nov. 8, 1966

3,283,411

TRACKING ERROR MEASURING DEVICE

Alan A. Steward, Somerset, Calif.

Filed Aug. 27, 1964, Ser. No. 392,523

1 Claim. (Cl. 33—180)

This invention relates to a device for visually measuring the tracking error or tangent error in phonograph record play-back systems.

Unless a phonograph cartridge is kept at all times tangent to the groove of a phonograph record, distortion will be produced. The problem becomes particularly serious with stereophonic recordings since an error in tracking not only will result in distortion but also a loss of the stereophonic effect.

Therefore, it is important in assembling a phonograph system that the pivot point of the tone arm be located in such a manner that a minimum of tracking error is produced as the tone arm traverses the disc. Although mathematical formulas exist for locating the optimum pivot point, such formulas are complex and often confusing to those who are not mathematically minded. Further, the formulas are not perfect so that there is always the possibility of not locating the exact optimum pivot point even in those instances where the formulas are correctly applied.

In accordance with the present invention, a simple, inexpensive device is provided so that the tracking error can be measured visually without mathematical computations. Thus the pivot point for the tone arm can be shifted experimentally until an optimum value is obtained.

In the drawings forming a part of this application:

Figures 1, 2:
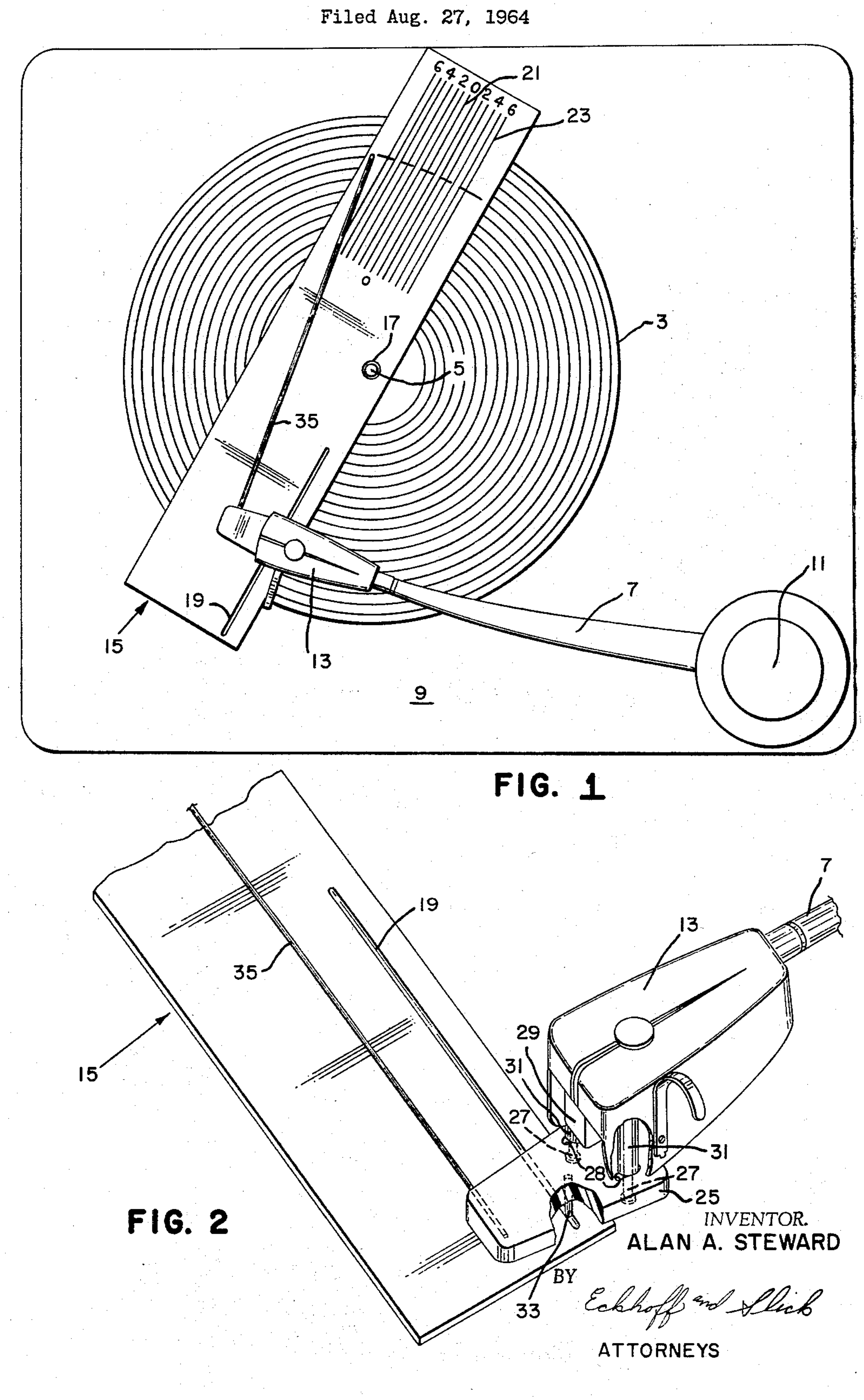
FIGURE 1 is a plan view of the device embodying the present invention showing it installed on a conventional phonograph turntable and pick-up arm.
FIGURE 2 is an enlarged perspective or a portion of the device shown in FIGURE 1, partly in section.

Turning now to a description of the device by reference characters, there is shown a conventional phonograph turntable 3 having a center spindle 5. A tone arm 7 is mounted on a base 9 at the pivot point 11. The tone arm 7 carries a head to which is attached pick-up cartridge 13.

The device of the present invention comprises two parts which can be easily attached to any phonograph system. The first part is a calibrated scale generally designated 15. The calibrated scale is conveniently made of plastic although it could be made of metal, cardboard or wood. The scale 15 has a hole 17 adapted to be placed over the center spindle 5 and has a groove 19 therein which is in line with the hole 17. The length of the groove is approximately the width of the recording on a normal phonograph record. At the opposite end of the scale are a series of calibrations with a center line 21 representing zero tracking error while on either side of the center line are other lines as at 23 showing tracking error in one direction or the other. Although the lines 23 can be calibrated in degrees, purely arbitrary numbers can be used since one is ordinarily interested only in finally achieving a pivot point of minimum error and not in measuring the actual angle of error.

The second part of the device comprises a member 25 which can be attached to the head 13 by means of screws 27. Normally the cartridge 29 is held to the head by means of short screws so that it is easy to attach the device 25 using longer screws than would normally be used to attach the cartridge and employing sleeves 31 to space the member 25 from the head 13. Thus the device of the present invention can be attached to a phonograph utilizing the normal attachment holes for the cartridge so that it is not necessary to deface the equipment in any manner. If desired, the holes in the member 25 through which the screws 27 pass can be in the form of short slots 28 in case it is desired to provide for minor adjustments to secure precise alignment between the member 25 and the cartridge 29.

Depending downwardly from the member 25 is a short, blunt pin 33 which fits into the groove 19. Extending outwardly, i.e., toward the center of the disc from the member 25, is a pointer 35. The pointer 35 normally overlies the indicia at the opposite end of the member 15.

To utilize the device it is only necessary to put the scale member 15 over the central spindle of the phonograph as is shown in FIGURE 1 and attach the member 25 to the tone arm as is shown in FIGURE 2. An arbitrary pivot point 11 is then selected and the pin 33 is moved from one end of the groove 19 to the other, noting the deviation which is produced by the pointer 35 in traversing over the scale. The pivot point is changed somewhat and the operation repeated until a position is found for the pivot point 11 which gives the least amount of movement of the pointer 35.

It is believed apparent from the foreging that I have provided a simple, yet effective, device for measuring tracking error and determining the optimum pivot point for a phonograph tone arm.

I claim:

A device for measuring tracking error and locating optimum pivot point placement of a phonograph tone arm comprising in combination:

(a) a scale member having a hole therein adapted to be placed over the spindle of a phonograph;

(b) a groove in one end of said member, said groove being in alignment with said hole;

(c) indicia at the opposite end of said member; and, (d) a member attached to the tone arm of the phonograph, said member having a downwardly extending pin adapted to slide in the groove of the first member and an outwardly extending pointer, said pointer being adapted to move over the indicia of the first member.

No references cited.

LEONARD FORMAN, *Primary Examiner.*